United States Patent
Wright

(10) Patent No.: US 8,060,661 B1
(45) Date of Patent: Nov. 15, 2011

(54) INTERFACE CIRCUIT AND METHOD FOR PROGRAMMING OR COMMUNICATING WITH AN INTEGRATED CIRCUIT VIA A POWER SUPPLY PIN

(75) Inventor: David G. Wright, San Diego, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 62 days.

(21) Appl. No.: 11/691,676

(22) Filed: Mar. 27, 2007

(51) Int. Cl.
*G06F 3/00* (2006.01)
*G06F 13/00* (2006.01)

(52) U.S. Cl. ................. 710/8; 710/104; 710/7; 714/734
(58) Field of Classification Search ................. 710/7, 8, 710/104; 714/734
See application file for complete search history.

(56) References Cited

U.S. PATENT DOCUMENTS

| | | | |
|---|---|---|---|
| 4,727,514 A | 2/1988 | Bhuva et al. | |
| 4,734,885 A | 3/1988 | Luich | |
| 5,163,146 A | 11/1992 | Antanaitis et al. | |
| 5,336,951 A | 8/1994 | Josephson et al. | |
| 5,369,703 A | 11/1994 | Archibald et al. | |
| 5,376,834 A | 12/1994 | Carobolante | |
| 5,418,969 A | 5/1995 | Matsuzaki et al. | |
| 5,481,549 A | 1/1996 | Tokuyama | |
| 5,568,083 A | 10/1996 | Uchiyama et al. | |
| 5,594,442 A * | 1/1997 | Paulos et al. | 341/143 |
| 5,629,635 A | 5/1997 | Reno | |
| 5,661,685 A | 8/1997 | Lee et al. | |
| 5,664,205 A | 9/1997 | O'Brien et al. | |
| 5,693,570 A * | 12/1997 | Cernea et al. | 438/107 |
| 5,726,995 A | 3/1998 | Wong | |
| 5,748,684 A | 5/1998 | Sanchez | |
| 5,838,950 A | 11/1998 | Young et al. | |
| 5,877,719 A * | 3/1999 | Matsui et al. | 341/155 |
| 5,878,234 A | 3/1999 | Dutkiewicz et al. | |
| 5,925,110 A | 7/1999 | Klein | |
| 6,038,400 A | 3/2000 | Bell et al. | |
| 6,105,155 A | 8/2000 | Cheng et al. | |
| 6,182,163 B1 | 1/2001 | Yamashita et al. | |
| 6,191,614 B1 | 2/2001 | Schultz et al. | |

(Continued)

FOREIGN PATENT DOCUMENTS

EP 0619548 A1 10/1994

OTHER PUBLICATIONS

National Semiconductor, Jun. 1989, "54150/DM54150/DM741150, 54151A/DM54151A/DM74151A Data Selectors/Multiplexers" Datasheet.*

(Continued)

*Primary Examiner* — Alford Kindred
*Assistant Examiner* — Farley Abad

(57) ABSTRACT

An interface circuit and method for programming or communicating with an integrated circuit (IC) via a power supply pin is provided herein. In general, the power supply pin may be coupled for receiving a relatively constant voltage signal during a first mode of operation (i.e., a normal mode) and a modulated voltage signal during a second mode of operation (i.e., a programming or communication mode). The interface circuit may be coupled between the power supply pin and other IC components for decoding the modulated voltage signal into data. Various encoding/decoding schemes may be used by the interface circuit and method for communicating data to the IC over the power supply lines. The decoded data may be used for programming or communication purposes.

11 Claims, 8 Drawing Sheets

U.S. PATENT DOCUMENTS

| | | | |
|---|---|---|---|
| 6,195,712 B1 | 2/2001 | Pawlowski et al. | |
| 6,253,268 B1 | 6/2001 | Bjorkengren et al. | |
| 6,256,240 B1 | 7/2001 | Shinozaki | |
| 6,260,139 B1* | 7/2001 | Alfke | 713/1 |
| 6,281,716 B1 | 8/2001 | Mihara | |
| 6,298,448 B1 | 10/2001 | Shaffer et al. | |
| 6,320,809 B1 | 11/2001 | Raad | |
| 6,330,231 B1 | 12/2001 | Bi | |
| 6,400,605 B1* | 6/2002 | Adkins | 365/185.18 |
| 6,429,682 B1 | 8/2002 | Schultz et al. | |
| 6,499,123 B1 | 12/2002 | McFarland et al. | |
| 6,509,845 B1 | 1/2003 | Tanaka | |
| 6,577,157 B1* | 6/2003 | Cheung et al. | 326/38 |
| 6,577,175 B2 | 6/2003 | Kim et al. | |
| 6,798,254 B2 | 9/2004 | Marshall et al. | |
| 6,865,113 B2* | 3/2005 | Voicu et al. | 365/185.28 |
| 6,912,606 B2 | 6/2005 | Fay | |
| 6,924,790 B1 | 8/2005 | Bi | |
| 6,999,342 B2 | 2/2006 | Ooishi | |
| 7,030,668 B1 | 4/2006 | Edwards | |
| 7,089,434 B2 | 8/2006 | Kuo | |
| 7,096,137 B2 | 8/2006 | Shipton et al. | |
| 7,107,178 B2 | 9/2006 | Won et al. | |
| 7,174,144 B2 | 2/2007 | Lin | |
| 7,176,726 B2 | 2/2007 | Bock | |
| 7,224,801 B2 | 5/2007 | Abdo et al. | |
| 7,228,476 B2 | 6/2007 | Scipioni et al. | |
| 7,269,780 B2 | 9/2007 | Arima et al. | |
| 7,304,923 B2 | 12/2007 | Sano et al. | |
| 7,310,757 B2 | 12/2007 | Ngo et al. | |
| 7,392,409 B2 | 6/2008 | Tateyama | |
| 7,392,447 B2 | 6/2008 | Tang et al. | |
| 7,415,624 B2 | 8/2008 | Miller et al. | |
| 7,415,647 B2* | 8/2008 | Yee | 714/734 |
| 7,421,291 B2 | 9/2008 | Karaoguz et al. | |
| 7,424,553 B1 | 9/2008 | Borrelli et al. | |
| 7,496,692 B2 | 2/2009 | Holm et al. | |
| 7,508,242 B2 | 3/2009 | Tokuno | |
| 7,532,056 B2 | 5/2009 | Seo | |
| 7,579,895 B2 | 8/2009 | Sun et al. | |
| 7,626,576 B2 | 12/2009 | Anandakumar et al. | |
| 7,672,258 B1 | 3/2010 | Wu et al. | |
| 7,679,964 B2 | 3/2010 | Lee | |
| 7,710,939 B2 | 5/2010 | Shao et al. | |
| 7,739,529 B2 | 6/2010 | Hardman et al. | |
| 7,760,655 B2 | 7/2010 | Wilhelm | |
| 7,795,893 B2 | 9/2010 | Agatsuma | |
| 7,802,212 B2 | 9/2010 | Best et al. | |
| 7,844,308 B2 | 11/2010 | Rhee et al. | |
| 2002/0108011 A1 | 8/2002 | Tanha | |
| 2003/0031320 A1 | 2/2003 | Fan et al. | |
| 2003/0074364 A1 | 4/2003 | Sewall et al. | |
| 2003/0093751 A1 | 5/2003 | Hohl | |
| 2005/0052437 A1 | 3/2005 | Hudson | |
| 2005/0071730 A1 | 3/2005 | Moyer et al. | |
| 2005/0093572 A1 | 5/2005 | Sun et al. | |
| 2006/0035590 A1 | 2/2006 | Morris et al. | |
| 2006/0212838 A1 | 9/2006 | Carson et al. | |
| 2006/0236147 A1 | 10/2006 | Best et al. | |
| 2008/0071972 A1 | 3/2008 | Kimura | |
| 2008/0086626 A1 | 4/2008 | Jones et al. | |
| 2009/0167093 A1 | 7/2009 | Nguyen et al. | |
| 2009/0315582 A1 | 12/2009 | Agatsuma | |

OTHER PUBLICATIONS

The Authoritative Dictionary of IEEE Standard Terms, Seventh Edition, 2000, (selected definitions) ISBN 0738126012.*

U.S. Appl. No. 12/075,633: "Encoded Acknowledge Signal for Wireless Communication," David G. Wright, filed on Mar. 12, 2008; 28 pages.

USPTO Non-Final Rejection for U.S. Appl. No. 12/075,633 dated Apr. 26, 2010; 11 pages.

U.S. Appl. No. No. 12/075,632: "Interrupt Latency Reduction," David G. Wright, filed on Mar. 12, 2008; 31 pages.

USPTO Non-Final Rejection for U.S. Appl. No. 12/075,632 dated May 25, 2010; 9 pages.

USPTO Final Rejection for U.S. Appl. No. 12/075,632 dated Feb. 3, 2010; 9 pages.

USPTO Non-Final Rejection for U.S. Appl. No. 12/075,632 dated Jun. 24, 2009; 6 pages.

The Authoritative Dictionary of IEEE Standard Terms, Seventh Edition, 2000, (selected definitions) ISBN 0738126012; 6 pages.

Wong et al., "Flexible Test Mode Design for DRAM Characterization," 1996 Symposium on VLSI Circuits Digest of Technical Papers, Vol., No., pp. 194-195, Jun. 13-15, 1996, doi: 10.1109/VLSIC.1996.507768; 2 pages.

USPTO Notice of Allowance for U.S. Appl. No. 12/005,775 dated Jun. 19, 2009; 6 pages.

USPTO Non-Final Rejection for U.S. Appl. No. 12/005,775 dated Sep. 22, 2009; 4 pages.

USPTO Non-Final Rejection for U.S. Appl. No. 12/005,775 dated Feb. 11, 2009; 5 pages.

U.S. Appl. No. 12/005,768: "Intelligent Power Supervisor," David G. Wright, filed on Dec. 27, 2007; 43 pages.

USPTO Notice of Allowance for U.S. Appl. No. 12/005,768 dated Jun. 28, 2010; 6 pages.

USPTO Non-Final Rejection for U.S. Appl. No. 12/005,768 dated Feb. 16, 2010; 8 pages.

USPTO Non-Final Rejection for U.S. Appl. No. 12/005,768 dated Aug. 20, 2009; 7 pages.

USPTO Requirement for Restriction/Election for U.S. Appl. No. 12/005,768 dated May 11, 2009; 6 pages.

U.S. Appl. No. 11/973,038: "Programmable Voltage Regulator," David G. Wright, filed on Oct. 4, 2007; 51 pages.

USPTO Non-Final Rejection for U.S. Appl. No. 11/973,038 dated Jul. 1, 2010; 5 pages.

USPTO Final Rejection for U.S. Appl. No. 11/973,038 dated Mar. 25, 2010; 5 pages.

USPTO Non-Final Rejection for U.S. Appl. No. 11/973,038 dated Oct. 23, 2009; 5 pages.

U.S. Appl. No. 11/973,090: "Intelligent Voltage Regulator," David G. Wright, filed on Oct. 4, 2007; 51 pages.

USPTO Non-Final Rejection for U.S. Appl. No. 11/973,090 dated Jun. 22, 2010; 7 pages.

USPTO Advisory Action for U.S. Appl. No. 11/973,090 dated May 20, 2010; 2 pages.

USPTO Final Rejection for U.S. Appl. No. 11/973,090 dated Mar. 9, 2010; 7 pages.

USPTO Non-Final Rejection for U.S. Appl. No. 11/973,090 dated Sep. 21, 2009; 7 pages.

U.S. Appl. No. 12/005,774: "Intelligent Serial Interface," David G. Wright, filed on Dec. 28, 2007; 30 pages.

USPTO Final Rejection for U.S. Appl. No. 12/005,774 dated Mar. 23, 2010; 14 pages.

USPTO Non-Final Rejection for U.S. Appl. No. 12/005,774 dated Sep. 15, 2009; 12 pages.

U.S. Appl. No. 12/005,748: "Firmware Memory of an Integrated Circuit," David G. Wright, filed on Dec. 28, 2007; 31 pages.

USPTO Non-Final Rejection for U.S. Appl. No. 12/005,748 dated May 11, 2010; 14 pages.

U.S. Appl. No. 12/005,950: "Ultra Low Power Sleep Mode," David G. Wright, filed on Dec. 28, 2007; 30.

U.S. Appl. No. 11/904,644: "Configuration of Programmable Device using a DMA Controller," David G. Wright, filed on Sep. 28, 2007; 34 pages.

USPTO Final Rejection for U.S. Appl. No. 11/904,644 dated Apr. 28, 2010; 7 pages.

USPTO Non-Final Rejection for U.S. Appl. No. 11/904,644 dated Oct. 28, 2009; 6 pages.

Baldoni et al., "Properties of Communication Modes in Distributed Systems," Algorithms and Architectures for Parallel Processing, 1995, ICAPP 95, IEEE First ICA/sup 3/PP., IEEE First International Conference on, vol. 2, No., pp. 501-504, vol. 2, Apr. 19-21, 1995, doi: 10.1109/ICAPP.1995.472232; 4 pages.

U.S. Appl. No. 11/904,643: "Integrity Checking of Configurable Data of Programmable Device," David G. Wright, filed Sep. 28, 2007; 34 pages.

USPTO Notice of Allowance for U.S. Appl. No. 11/904,643 dated Feb. 26, 2010; 8 pages.

USPTO Notice of Allowance for U.S. Appl. No. 11/904,643 dated Nov. 3, 2009; 7 pages.
USPTO Non-Final Rejection for U.S. Appl. No. 11/904,643 dated Apr. 3, 2009; 9 pages.
U.S. Appl. No. 12/005,743: "Acquiring a Mode of an Integrated Circuit," David G. Wright, filed on Dec. 27, 2007; 33 pages.
USPTO Non-Final Rejection for U.S. Appl. No. 12/005,743 dated Jun. 7, 2010; 11 pages.
U.S. Appl. No. 12/075,748: "Secure Wireless Transmission," David G. Wright, filed on Mar. 12, 2008; 25 pages.
USPTO Non-Final Rejection for U.S. Appl. No. 12/005,950 dated Sep. 13, 2010; 8 pages.
USPTO Non-Final Rejection for U.S. Appl. No. 11/904,644 dated Aug. 9, 2010; 7 pages.
USPTO Final Rejection for U.S. Appl. No. 12/075,632 dated Nov. 26, 2010; 10 pages.
USPTO Advisory Action for U.S. Appl. No. 12/075,632 dated Feb. 4, 2011; 3 pages.
USPTO Final Rejection for U.S. Appl. No. 12/075,633 dated Nov. 24, 2010; 13 pages.
USPTO Non-Final Rejection for U.S. Appl. No. 12/005,950 dated Sep. 13, 2010; 8 pages.
USPTO Non-Final Rejection for U.S. Appl. No. 12/005,768 dated Oct. 1, 2010; 7 pages.
USPTO Non-Final Rejection for U.S. Appl. No. 12/005,774 dated Oct. 27, 2010; 14 pages.
USPTO Final Rejection for U.S. Appl. No. 12/005,774 dated Feb. 8, 2011; 12 pages.
USPTO Final Rejection for U.S. Appl. No. 12/005,748 dated Sep. 24, 2010; 15 pages.
USPTO Notice of Allowance for U.S. Appl. No. 12/005,775 dated Dec. 17, 2010; 6 pages.
USPTO Final Rejection for U.S. Appl. No. 11/973,038 dated Oct. 13, 2010; 5 pages.
USPTO Notice of Allowance for U.S. Appl. No. 11/973,038 dated Jan. 6, 2011; 6 pages.
USPTO Notice of Allowance for U.S. Appl. No. 11/973,090 dated Sep. 30, 2010; 6 pages.
USPTO Final Rejection for U.S. Appl. No. 11/904,644 dated Jan. 21, 2011; 7 pages.
USPTO Non-Final Rejection for U.S. Appl. No. 11/904,644 dated Aug. 9, 2010; 7 pages.
USPTO Non-Final Rejection for U.S. Appl. No. 12/075,633 dated Feb. 22, 2011; 12 pages.
USPTO Non-Final Rejection for U.S. Appl. No. 12/005,950 dated Feb. 17, 2011; 9 pages.
USPTO Notice of Allowance for U.S. Appl. No. 12/005,768 dated Feb. 17, 2011; 7 pages.
USPTO Non-Final Rejection for U.S. Appl. No. 12/005,748 dated Mar. 18, 2011; 13 pages.
USPTO Advisory Action for U.S. Appl. No. 11/904,644 dated Mar. 28, 2011; 2 pages.
USPTO Advisory Action for U.S. Appl. No. 11/904,644 dated Jul. 16, 2010; 3 pages.
USPTO Non-Final Rejection for U.S. Appl. No. 12/005,743 dated Jun. 4, 2010; 12 pages.
USPTO Advisory Action for U.S. Appl. No. 12/075,632 dated Apr. 19, 2010; 3 pages.
USPTO Non-Final Rejection for U.S. Appl. No. 12/075,748 dated Jun. 7, 2011; 10 pages.

* cited by examiner

INTERFACE CIRCUIT AND METHOD FOR PROGRAMMING OR COMMUNICATING WITH AN INTEGRATED CIRCUIT VIA A POWER SUPPLY PIN

BACKGROUND OF THE INVENTION

1. Field of the Invention

This invention relates to integrated circuits and, more particularly, to an interface circuit and method for communicating with an integrated circuit via the power supply pin.

2. Description of the Related Art

The following descriptions and examples are given as background only.

An integrated circuit (IC) may be described as "nonprogrammable" if its configuration is fixed at the time of manufacture. For example, a great number of "standard" ICs are made using fixed mask sets (e.g., masked ROMs or masked gate arrays). These ICs can be purchased from catalogs based on published specifications. "Custom" or "semi-custom" ICs are also considered to be nonprogrammable. A "custom" IC is one that is built for a specific purpose for a specific customer. In order to make a custom IC, a custom mask is made to establish memory contents or logic networks at the time of manufacture. Although the mask is specified by the customer, it is nonetheless fixed, and cannot be altered once the IC is packaged.

In contrast, the configuration of a "programmable" device is not fixed and may be programmed after the device is manufactured. This feature offers many advantages over nonprogrammable devices from the perspective of the circuit board manufacture. One advantage is that memory contents and logic designs need not be finalized until late in the manufacturing process. This reduces lead time and time-to-market by making it possible to begin board manufacturing before logic designs are fully completed.

In some cases, an integrated circuit may be described as "programmable" if the IC contains nonvolatile storage. Nonvolatile storage is used for many purposes in many different kinds of programmable devices. Examples of programmable devices having nonvolatile storage include, but are not limited to, programmable logic devices (PLD), programmable logic and gate arrays (e.g., PAL, GAL and FPGA), microcontrollers, microprocessors, programmable clock chips, and other digital and analog ICs. Among other things, digital ICs may use nonvolatile storage to store CPU instructions, configuration settings, calibration data, log measurement data and other types of information well known to those skilled in the art. On the other hand, analog ICs may use nonvolatile storage to hold potentiometer adjustment settings, to provide lookup tables for analog functions, and to hold trim settings for high-precision clock devices.

Examples of nonvolatile storage include, but are not limited to, Programmable Read-Only Memory (PROM), Electrically Erasable PROM (EEPROM), Magnetic Random Access Memory (MRAM) and various types of Flash memory. Flash memory is commonly used for storing microprocessor instruction codes. Due to its relatively high density (silicon area/storage unit), Flash memory is also used in many consumer storage applications. Nonvolatile memories are also found within many microcontrollers. For example, some microcontrollers include Flash and/or EEPROM.

In general, programmable devices are differentiated into One-Time Programmable (OTP) devices and reprogrammable devices. OTP and reprogrammable devices are often used for development and prototyping, in addition to lower volume and higher value products. Although these devices may be programmed by the customer, the logistics of programming ICs in large quantities can be troublesome in the product manufacturing environment. For this reason, many customers ask the IC or board manufacturer to program the ICs during manufacture.

Reprogrammable devices offer many advantageous over OTP devices. As noted above, many customers ask the IC or board manufacturer to program OTP devices at the time of manufacture. However, because the customer receives preprogrammed devices, the customer must maintain inventory of each differently programmed device. Reprogrammable devices reduce inventory needs and hardware costs by enabling the customer to program devices as needed.

In addition, OTP devices may only be programmed with very general purpose information (e.g., CPU instruction software or the device serial number). For example, it is not practical to program OTP devices with manufacturing and quality data or individual product-specific data (e.g., configuration and calibration data), as in many cases this data may need to be programmed multiple times. This makes it difficult, if not impossible, to "tweak" the device (e.g., by setting calibration data) after the device is manufactured. Since product-specific information may be stored within reprogrammable devices, they enable engineering changes (e.g., bug fixes and firmware upgrades) to be made quickly and at any time, thereby reducing lead time and time-to-market.

"In System Reprogrammability" (ISR) is often described as the ability to program (or reprogram) an integrated circuit after the circuit is embedded onto a circuit board. The advantages of ISR are well recognized in the world of high volume product manufacturing. For example, ISR enables software instructions to be programmed into a device with a CPU after the device has been fully assembled. Most ISR devices use dedicated I/O pins and standard bus protocols for programming integrated circuits "in-system." Examples of standard bus protocols include, but are not limited to, $I^2C$ (Inter-IC bus), SPI (Serial Peripheral Interface) and JTAG (Joint Test Action Group). These bus protocols are well known in the art of electronic circuit design and will not be described further herein.

Problems arise with conventional ISR circuits and methods. For example, conventional ISR circuits require at least one dedicated pin to be included on the IC for programming purposes. Because some ICs have very few I/O pins (e.g., as few as 6 I/O pins for some microcontrollers), dedicated pins tend to significantly increase the size and cost of the embedded IC. In addition, ISR is generally not possible once the circuit board has been placed in the final product enclosure, unless a special programming connector is exposed to the customer.

Therefore, a need exists for an improved circuit and method for programming an integrated circuit. More specifically, a need exists for an improved ISR method that enables an embedded integrated circuit to be programmed (or reprogrammed) without using any dedicated programming pins.

SUMMARY OF THE INVENTION

The following description of various embodiments of integrated circuits and methods is not to be construed in any way as limiting the subject matter of the appended claims.

According to one embodiment, an integrated circuit (IC) is provided herein with a power supply pin, an interface circuit and one or more IC components. In general, the power supply pin may be coupled for receiving a relatively constant voltage signal during a first mode of operation (i.e., a normal mode) and a modulated voltage signal during a second mode of operation (i.e., a programming or communication mode). A magnitude of the modulated voltage signal may remain within an operating voltage range of the IC at all times.

In general, the interface circuit may be coupled between the power supply pin and other IC components for decoding the modulated voltage signal into data during the second mode of operation. For example, the interface circuit may include a data detect circuit and a data decode circuit. The data detect circuit may be coupled for detecting variations in the amplitude, frequency or phase of the modulated voltage signal supplied to the power supply pin. The data decode circuit may be coupled for decoding the variations into data. Various encoding/decoding schemes may be used for communicating data to the IC over the supply lines. The decoded data may be supplied to at least one of the IC components for programming or communication purposes.

According to another embodiment, a method is provided herein for programming or communicating with an integrated circuit (IC) via a power supply pin. In general, the method may begin by detecting a power-on-reset (POR) sequence associated with the IC. In some cases, the IC may enter a communication mode of operation, if a predetermined sequence of data bits is received during a specified time period immediately following the POR sequence. In other cases, the IC may enter a normal mode of operation, if the predetermined sequence of data bits is not received during the specified time period. Unlike conventional methods, the predetermined sequence of data bits is supplied to the power supply pin of the IC. By utilizing the power supply pin, the present method enables data to be communicated to the IC without using any dedicated pins for programming or communication purposes.

According to a more specific embodiment, a method is provided herein for programming an integrated circuit (IC) "in-system." In some cases, various steps of the method may be performed by a programmer of the IC. For example, a programmer may request that a programming mode be entered by supplying a first modulation sequence to a power supply pin of the IC. Sometime thereafter, the programmer may receive confirmation that the programming mode has been entered upon detecting a second modulation sequence at the power supply pin. Sometime thereafter, the programmer may supply programming data to the IC by supplying a third modulation sequence to the power supply pin. Sometime thereafter, the programmer may receive confirmation that the IC has been successfully programmed by detecting a fourth modulation sequence at the power supply pin.

In one example, the programmer may generate the first and third modulation sequences by modulating the frequency of an externally generated voltage signal. On the other hand, the second and fourth modulation sequences may be generated by an internal IC component. For example, the IC component may be coupled for modulating the frequency of an internal oscillator, such that the second and fourth modulation sequences are supplied to the power supply pin in the form of clock noise.

In other cases, various steps of the method may be performed by internal components of the IC. For example, an IC component may detect a request to enter a programming mode by detecting a first modulation sequence on the supply lines. Sometime thereafter, an IC component may send confirmation that the programming mode has been entered by modulating the frequency of an internal oscillator, so that a second modulation sequence is supplied to the power supply pin in the form of clock noise. Sometime thereafter, an IC component may receive programming data by detecting a third modulation sequence on the supply lines. After all programming data is received, an IC component may generate a checkword for all newly programmed data and communicate the checkword to a programmer of the IC. For example, an IC component may modulate the frequency of the internal oscillator once more, so that a fourth modulation sequence is supplied to the power supply pin in the form of clock noise.

BRIEF DESCRIPTION OF THE DRAWINGS

Other objects and advantages of the invention will become apparent upon reading the following detailed description and upon reference to the accompanying drawings in which.

Figure 1A:
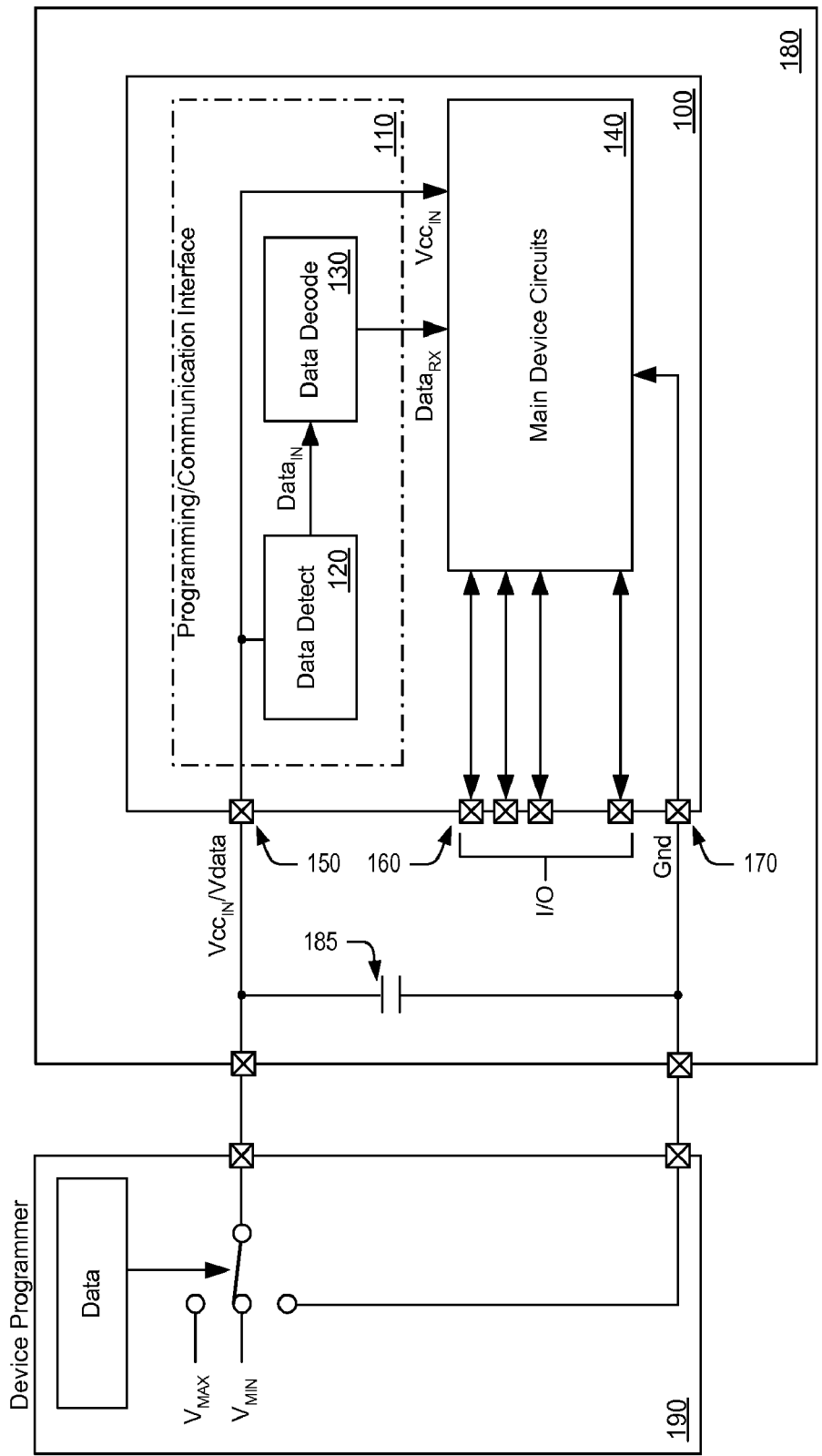
FIG. 1A is a block diagram illustrating one preferred embodiment of an integrated circuit (IC) having an interface circuit, which is coupled to a power supply pin of the IC for receiving and decoding a modulated voltage signal into data during a programming or communication mode of the IC.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

In general, improved interface circuits and methods are provided herein for programming or communicating with an integrated circuit (IC) via a power supply pin. In one aspect, the methods may be used for performing in-system programming (ISR) of an integrated circuit. As used herein, the term "in-system programming" may refer to the exchange and/or storage of data or programming instructions within an integrated circuit, which is embedded on a circuit board. In some cases, the circuit board may be placed within the final product enclosure at the time of programming. In other cases, it may not. An integrated circuit with an improved interface circuit is also provided herein. In addition to providing in-system programming, the improved interface circuit may be used simply to communicate with embedded ICs. As such, the terms "programming interface" or "communication interface" may be used interchangeably throughout this disclosure to describe the improved interface circuit.

The improved interface circuit and methods described herein provide many advantages over conventional interface circuits and methods. In one example, the improved interface circuit and methods may provide programming and/or communication data to ICs without using any dedicated pins for programming (or communication) purposes. Instead, data is communicated to the IC via the power supply pin. This enables the present invention to reduce the overall pin count, package size and cost typically associated with the design and manufacture of ICs. In addition, in-system programming may be easily performed after the IC and circuit board have been placed in the final product enclosure. By utilizing the power supply pin, the present invention enables device prototyping, as well as device calibration, debugging and upgrading, without the need to open the enclosure or expose special programming connections to the customer. This reduces costs even further and adds a unique level of convenience. Further advantages may become apparent in light of the discussion provided below.

I. A General Embodiment of an Improved Interface Circuit

FIG. 1A illustrates one embodiment of an improved interface circuit 110 for programming or communicating with at least one IC 100 embedded on a circuit board 180. In the general embodiment of FIG. 1A, the interface circuit 110 includes data detect 120 and data decode 130 circuits coupled between the power supply pin 150 and the main device components 140 of the IC. As described in more detail below, the interface circuit 110 may be coupled for detecting a modulated voltage signal, which is supplied to the power supply pin during programming or communication modes, and for decoding the modulated voltage signal into data. A ground pin 170 and a fixed number of input/output (I/O) pins 160 may also be included on the IC.

During normal modes of operation, a relatively constant voltage signal ($VCC_{ext}$) may be supplied to the power supply pin 150 of the IC for powering the main device components 140. Examples of common IC operating voltages include, but are not limited to, 1.8V-3.6V and 2.7V-5.5V. Other operating voltage ranges may be supplied, depending on the particular needs of the IC. During normal modes of operation, the $VCC_{ext}$ signal will remain within the operating voltage range of the IC.

During programming or communication modes, a modulated voltage signal (Vdata) may be supplied to the power supply pin 150 of the IC for communicating data and/or programming instructions to the main device components 140. As described in more detail below, the voltage signal (Vdata) may be modulated in accordance with any number of amplitude, frequency or phase modulation schemes. The data detect 120 and data decode 130 circuits may be uniquely configured to demodulate the voltage signal in accordance with the particular modulation scheme used. As described in more detail below, the interface circuit 110 may enter the programming or communication mode upon detecting a predetermined modulation sequence at the power supply pin 150. This enables the programming or communication mode to be entered without the use of pins (e.g., mode select or programming pins) dedicated to that purpose.

Exemplary data detect 120 and data decode 130 circuits will be described in more detail with reference to FIGS. 2-4 below. However, the data detect circuit 120 may be generally configured for detecting changes in the amplitude, frequency or phase of the modulated voltage signal (Vdata) supplied to the power supply pin 150. Likewise, the data decode circuit 130 may be generally configured for decoding the changes into data or program instructions ($Data_{RX}$). The decoded data may then be supplied to one or more of the main device components 140 for programming or communication purposes.

For purposes of simplicity, the terms "data" and "program instructions" may be used interchangeably throughout this disclosure. In some cases, the term "data" may refer to communication data, programming data or programming instructions. In some cases, the term "data" may refer to configuration data, calibration data, quality data and other general or product-specific data (e.g., device serial number). In other words, the interface circuit 110 described herein is not limited to receiving a particular type of data; any data that may be communicated or stored within an IC may be received at the power supply pin 150.

In one embodiment, a device programmer 190 may be used to generate the modulated voltage signal (Vdata) supplied to the power supply pin 150. In general, a "device programmer" may be described as any device capable of sending data to the IC 100 for storage in non volatile memory. Examples of device programmers include, but are not limited to, general purpose device programmers (such as those sold by DataIO, BPMicro and HiLo), system or board level ATE testers and custom ATE systems built to program/test a specific board or system. In most cases, the circuit board 180 containing the embedded IC 100 may be mounted inside a product, which is being programmed by the device programmer 190. A decoupling capacitor 185 may be included between the power supply and ground lines of the circuit board 180 to provide transient current to the device and prevent excessive noise on the supply voltage.

In some cases, data may be generated by modulating the amplitude of the power supply voltage between a voltage ($V_{MAX}$) near the maximum supply voltage ($VCC_{MAX}$) and a voltage ($V_{MIN}$) near the minimum supply voltage ($VCC_{MIN}$). The amplitude of the power supply voltage may be modulated in accordance with substantially any amplitude encoding scheme known in the art. Examples of commonly used amplitude encoding schemes include, but are not limited to, Pulse Width Modulation (PWM), Manchester encoding, Miller encoding. However, the invention is not limited to the encoding schemes specifically mentioned herein. In general, any self-clocking scheme may be used to encode the data within the power supply voltage.

In some cases, data may be generated by modulating the frequency of a signal modulated onto the power supply voltage between $V_{MAX}$ and $V_{MIN}$. The frequency of the power supply voltage may be modulated in accordance with substantially any frequency encoding scheme known in the art. Examples of commonly used frequency encoding schemes include, but are not limited to, Pulse Width Modulation (PWM), Manchester encoding, Miller encoding. However, the invention is not limited to the encoding schemes specifically mentioned herein. In general, any self-clocking scheme may be used to encode the data within the power supply voltage.

One advantage of the improved interface circuit 110 is that it enables data to be supplied to the IC via the power supply pin 150. This provides the distinct advantages of reduced pin count, package size and cost. It also enables device calibration, debugging and upgrading to be performed at any time and without including or exposing dedicated programming pins or connectors to the customer. Unlike other programming methods, the data supplied to the improved interface circuit 110 remains within the operating voltage of the main device components 140 at all times. This avoids a problem imposed on many conventional interface circuits, which require additional circuitry to maintain the supply voltage above the minimum operating voltage ($VCC_{MIN}$) of the main device components.

Examples of components 140, which may use the data for communication or programming purposes include programmable logic devices (PLD), programmable array logic (PAL), gate array logic (GAL), field programmable gate arrays (FPGA), microcontrollers, microprocessors, programmable clock chips, and other digital and analog ICs. However, the improved interface circuit 110 is not limited to the exemplary devices and circuits specifically mentioned herein. In general, the improved interface circuit 110 may be incorporated within substantially any IC, which is in need of programming/communication data. The IC may or may not be embedded on a circuit board prior to programming/communication.

In some embodiments, the main device components 140 may contain nonvolatile storage in addition to various components, which are typically needed to program the nonvolatile storage or control programming thereof. For example, the microcontroller 141 shown in FIG. 1B includes nonvolatile memory (NVM) 142 for storing data and/or program instructions used by the microcontroller. A Power-On-Reset (POR) 144 circuit is included to keep the microcontroller in a reset state until the power supply voltage exceeds the minimum operating voltage ($VCC_{MIN}$). In some cases, a Brown-Out-Reset (BOR, not shown) circuit may be included to reset the microcontroller when the power supply voltage falls below the minimum operating voltage ($VCC_{MIN}$). POR and BOR circuits are typically implemented with voltage references and comparators. When the supply voltage exceeds the reference voltage supplied to the POR circuit 144, the microcontroller is allowed to operate normally. Otherwise, the POR circuit holds the microcontroller in a reset state.

Figure 1B:
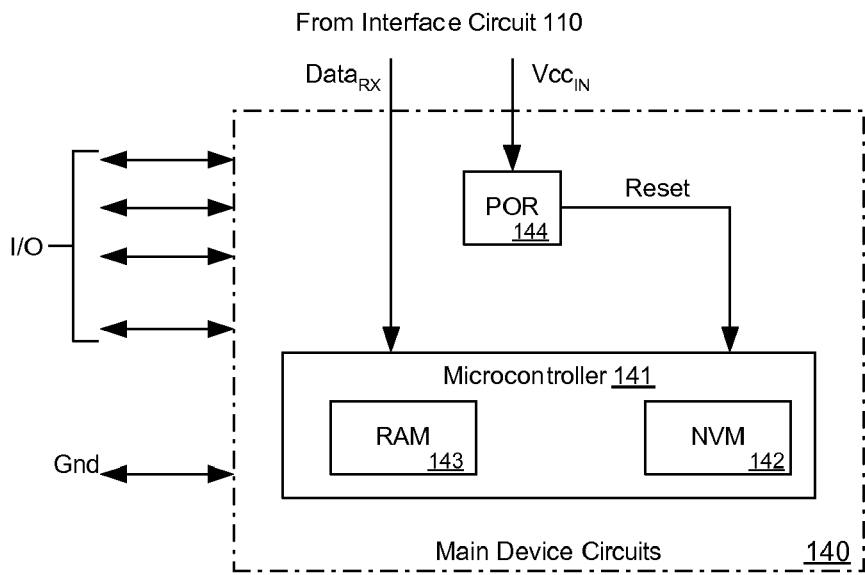
FIG. 1B is a block diagram illustrating one embodiment of IC components, which may be coupled for receiving the data.

In the embodiment of FIG. 1B, the microcontroller 141 contains the firmware necessary to program its own nonvolatile memory 142. In some cases, the firmware may be loaded and executed within random access memory (RAM) 143, while the nonvolatile memory 142 is programmed with data decoded from variations in the supply voltage. In other cases, the microcontroller may execute the firmware from one part of the nonvolatile memory 142 while reprogramming another part of the same memory. In any case, the microcontroller may run some form of boot firmware upon start up. The boot firmware waits for a defined period of time (e.g., 10 ms) after detecting the POR condition. During this "timeout period," the microcontroller monitors the data ($Data_{RX}$) decoded by interface circuit 110 for a predetermined modulation sequence (i.e., a predetermined sequence of 1's and 0's, as determined by the data detect and data decode circuits of FIG. 1A). The microcontroller will enter the programming mode if the sequence is detected in the allotted time. Otherwise, the microcontroller will enter a normal mode of operation, executing previously programmed firmware.

Figure 1C:
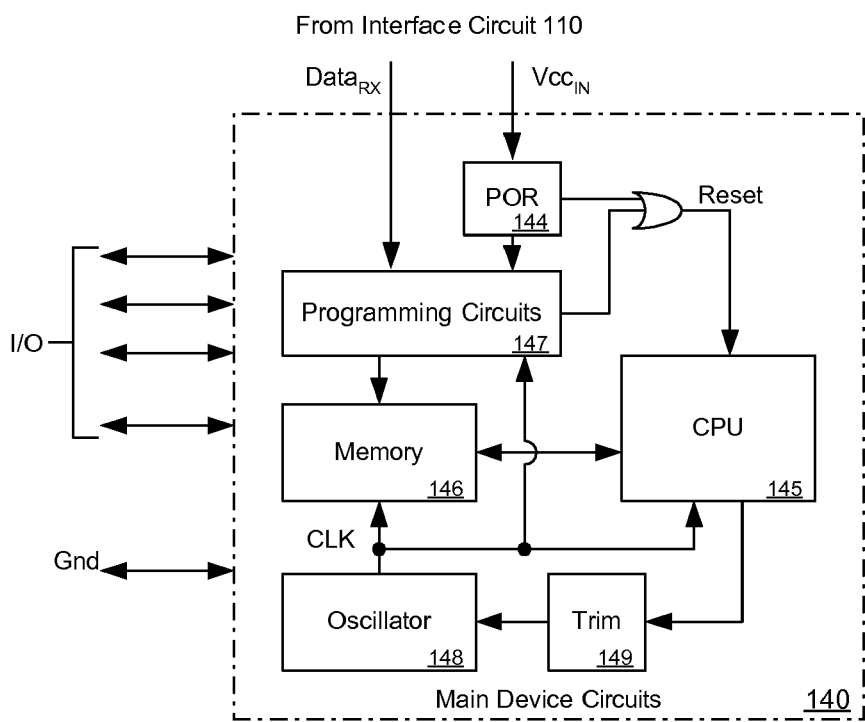
FIG. 1C is a block diagram illustrating another embodiment of IC components, which may be coupled for receiving the data.

FIG. 1C illustrates an embodiment of a microcontroller (MCU), which does not have the ability to program its own nonvolatile memory 146. In addition to the interface circuit 110 and POR circuit 144 mentioned above, the MCU chip 100 shown in FIG. 1C includes circuitry 147 needed to program the decoded data ($Data_{RX}$) within nonvolatile memory 146. Like the previous embodiment, processing unit 145 of the MCU may enter a programming mode, if a predetermined modulation sequence is detected during the timeout period. If the predetermined modulation sequence is not detected during such time, the MCU will enter a normal mode of operation executing previously programmed firmware.

Unlike the previous embodiment, programming circuits 147 shown in FIG. 1C may be responsible for decoding the timeout period, sequence recognition and memory reprogramming. In other cases, programming circuits 147 shown in FIG. 1C may only be responsible for memory reprogramming. In these cases, processing unit 145 of the MCU may be responsible for detecting/initializing the programming mode and receiving the data.

As shown in FIG. 1C, internal oscillator 148 and trim register 149 may also be included within MCU chip 100 to coordinate memory accesses and other circuit operations with respect to an internal clock signal (CLK). For example, many MCUs have internal "crystal-less" oscillators, which enable the MCU to generate its own clock signal without the need for an external oscillator. However, due to the inherent inaccuracy of such oscillators, it is often necessary to "trim" the oscillator (i.e., to calibrate the oscillation frequency) with calibration data. The calibration data is typically stored within nonvolatile memory and loaded into trim register 149 at reset. As shown in FIG. 1C, trim register 149 may be coupled between processing unit 145 and oscillator 148 for controlling the oscillator trim circuits (not shown). Processing unit 145 includes the necessary firmware or hardware to over-write the calibration data in the trim registers and change the oscillation frequency. In some cases, the oscillation frequency may be modulated onto the supply lines, even though attempts have been made to minimize such "clocking noise." As described in more detail below, some embodiments of the invention may utilize the clocking noise on the supply lines to communicate with an embedded IC.

II. Exemplary Interface Circuit Designs

Figure 2A:
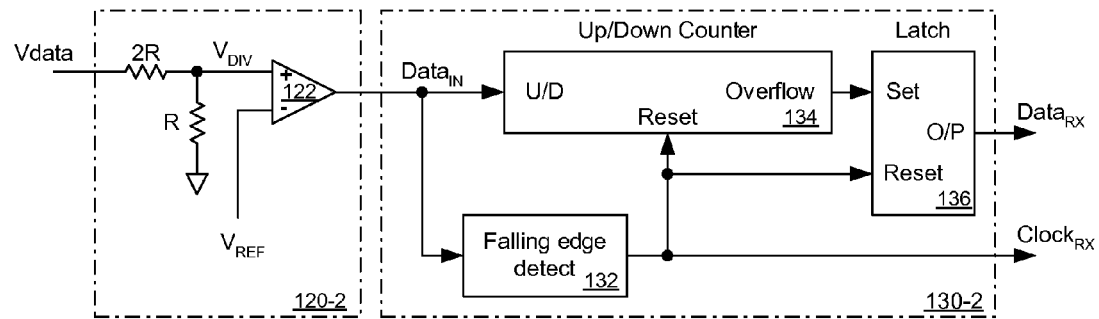
FIG. 2A is a block diagram illustrating one embodiment of an interface circuit configured for decoding amplitude modulated voltage signals.
Figure 2B:
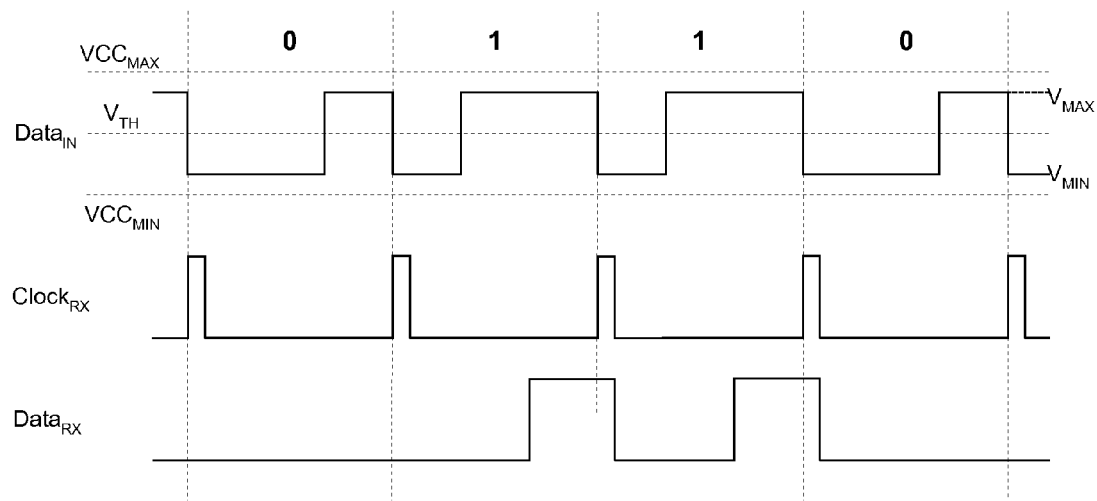
FIG. 2B is a timing diagram illustrating one embodiment of a decoding scheme, which may be used by the interface circuit of FIG. 2A to decode amplitude modulated voltage signals into data.
Figure 3A:
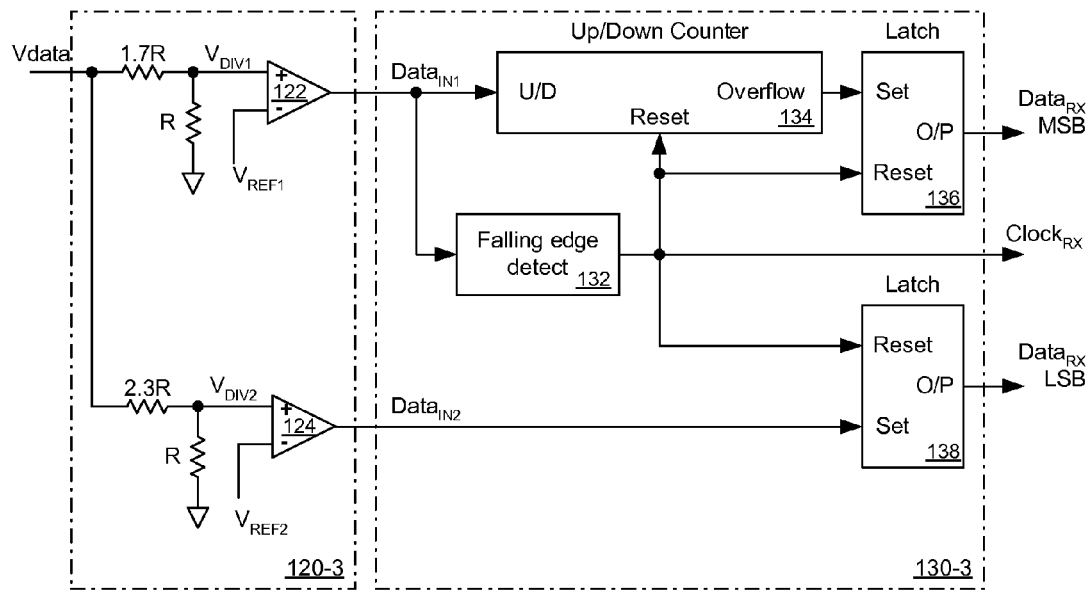
FIG. 3A is a block diagram illustrating another embodiment of an interface circuit configured for decoding amplitude modulated voltage signals.
Figure 3B:
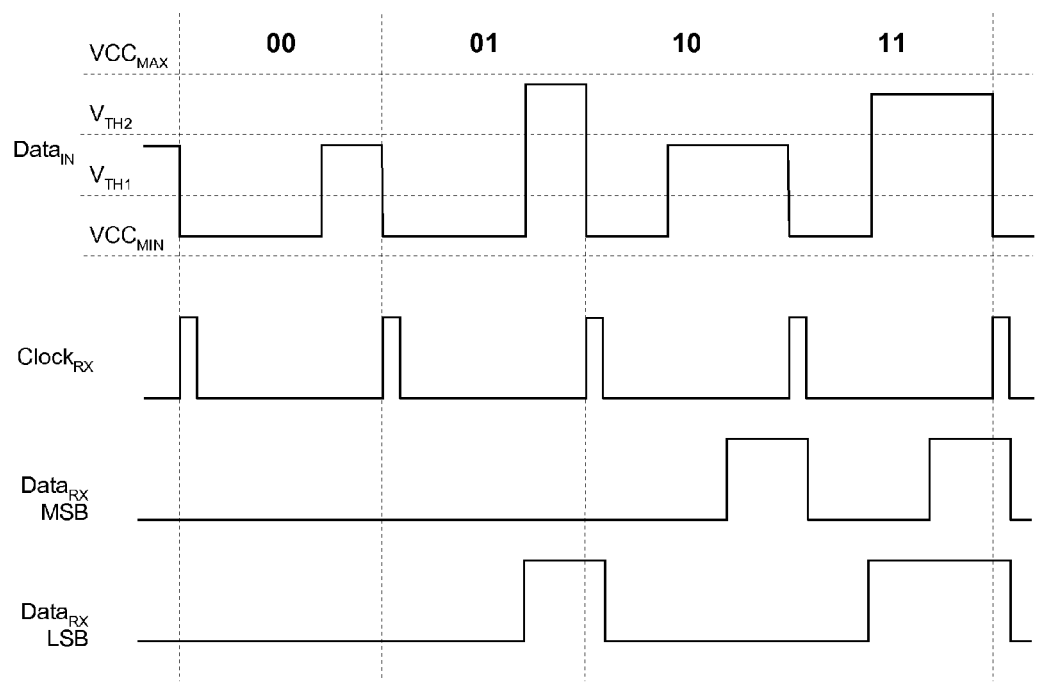
FIG. 3B is a timing diagram illustrating another embodiment of a decoding scheme, which may be used by the interface circuit of FIG. 3A to decode amplitude modulated voltage signals into data.
Figure 4A:
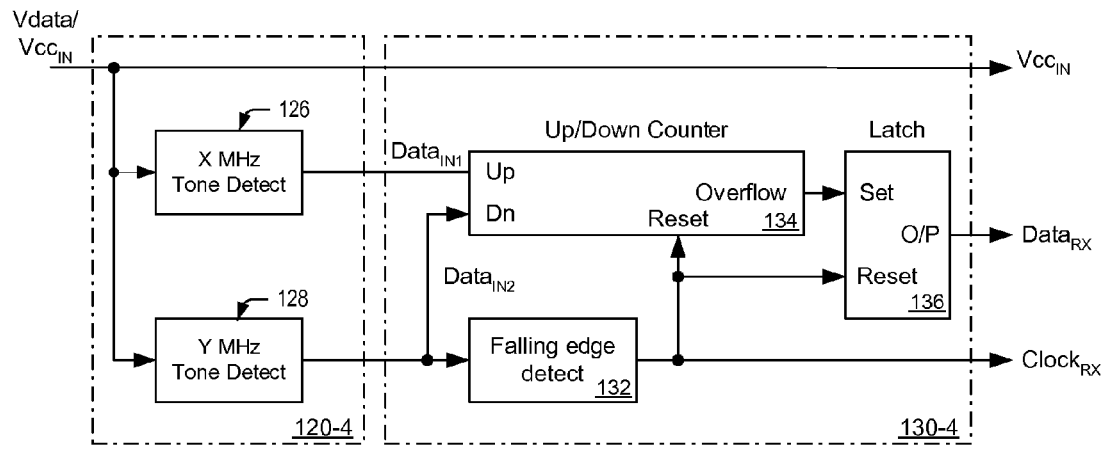
FIG. 4A is a block diagram illustrating one embodiment of an interface circuit configured for decoding frequency modulated voltage signals.

Various embodiments of data detect 120 and data decode 130 circuits used in the improved interface circuit 110 will now be described in reference to FIGS. 2-4. For example, FIGS. 2A and 3A illustrate exemplary embodiments, which may be used for decoding supply voltages modulated in accordance with various amplitude encoding schemes. FIG. 4A illustrates an embodiment that may be used for decoding supply voltages modulated in accordance with a frequency encoding scheme. However, it is worth noting that the data detect and data decode circuits described herein are not limited to the specific circuit configurations shown in FIGS. 2A, 3A and 4A. Other circuit configurations may be used to decode the supply voltage, depending on the particular encoding scheme used.

FIG. 2A illustrates one embodiment of an interface circuit 120-2/130-2 that may be used for decoding supply voltages in accordance with an amplitude modulation scheme. An exemplary timing diagram illustrating the operation of the interface circuit is shown in FIG. 2B. Although a Pulse Width Modulated (PWM) Amplitude Shift Keying (ASK) scheme is specifically used herein, one skilled in the art would understand how the interface circuit could be modified to accommodate other amplitude encoding schemes (e.g., Miller encoding and Manchester encoding, to name a few).

As shown in FIG. 2A, data detect circuit 120-2 includes a comparator 122 and a reference voltage ($V_{REF}$). The comparator detects variations in the supply voltage by comparing the amplitude of the supply voltage (Vdata) to that of the reference voltage ($V_{REF}$). The variations detected by the data detect circuit (Data$_{IN}$) are supplied to the data decode circuit 130-2 as a stream of logic high and logic low values (i.e., digital 1 and 0 values). For example, data detect circuit 120-2 may detect a low voltage value ($V_{MIN}$) on the supply, and output a 0 to data decode circuit 130-2, as long as the supply voltage divided by the potential divider ($V_{DIV}$) remains below the reference voltage. Once the supply voltage divided by the potential divider ($V_{DIV}$) exceeds the reference voltage, a 1 may be supplied to the data decode circuit.

As such, data detect circuit 120-2 is configured for converting modulated voltages on the Vdata signal into digital signals, which may be decoded by data decode circuit 130-2. Data decode circuit 130-2 decodes the data by detecting the "pulse width" of the digital signals generated by data detect circuit 120-2 in response to data modulated on the supply voltage signal. In general, the "pulse width" of a signal may refer to the duty cycle of the signal, or in other words, the amount of time that the signal is "high" during each clock cycle. As shown in FIG. 2B, the "pulse width" of the supply voltage signal varies, depending on whether a 0 or 1 is encoded into the signal. An exemplary bit stream of 0, 1, 1, 0 is shown in FIG. 2B for illustrative purposes.

In one embodiment, a threshold voltage ($V_{TH}$) of comparator 122 may be approximately mid-way between the minimum ($VCC_{MIN}$) and maximum ($VCC_{MAX}$) operating voltages of the main device components 140 (FIG. 1A), as shown in FIG. 2B. For example, a threshold voltage of approximately 4.0V may be used when the operating voltage swings between about 3-5V. However, the threshold voltage is not limited to the exemplary voltages mentioned herein, nor is it limited to the middle of the operating voltage swing. In general embodiments, the threshold voltage may fall anywhere between the minimum and maximum operating voltages of the main device components.

The reference voltage ($V_{REF}$) supplied to comparator 122 may be generated by any means known in the art. In one embodiment, the reference voltage may be generated by a bandgap reference circuit (BGR, not shown). Typical BGR circuits produce reference voltages in the range of about 1.2V to about 1.3V. In some cases, the supply voltage may be divided down ($V_{DIV}$) for comparison with a typical bandgap reference voltage. For example, a potential divider is used in the embodiment of FIG. 2A to divide the supply voltage, such that:

$$V_{DIV} = V\text{data}[R*(R+2R)] \quad [1]$$

The illustrated divider enables 3-5V operating swings to be used with typical bandgap reference voltages. For example, the illustrated divider may be used to produce a threshold voltage of about 4.0V when $V_{REF}$ is approximately 1V, or:

$$V_{TH} = [(R+2R)/R]*V_{REF} = 3*V_{REF} \quad [2]$$

However, data detect circuit 120 described herein is not limited to the particular potential divider shown in FIG. 2A. One skilled in the art would understand how an alternative network and/or reference may be used to set alternative supply voltage thresholds, if need be.

Data decode circuit 130-2 is coupled to data detect circuit 120-2 for decoding the logic values (Data$_{IN}$) into separate clock (Clock$_{RX}$) and data (Data$_{RX}$) signals. As shown in FIG. 2A, data decode circuit 130-2 may generally include an edge detect circuit 132, an up/down counter 134 and a latch 136. In general, edge detect circuit 132 may be configured for detecting the end of a bit period and for generating a clock pulse (Clock$_{RX}$) in response thereto. Any standard edge detect circuitry may be used including, but not limited to, various types of latches and flip-flops. In one embodiment, the clock pulse may be generated on falling edges of the Data$_{IN}$ signal, as shown in FIGS. 2A and 2B. However, the opposite may be true in other embodiments of the invention.

In general, up/down counter 134 may be configured for counting a number of system clock cycles that occur during each bit period. For example, a system clock (not shown) may be supplied to the up/down counter. It is assumed that the system clock is many times faster than the bit rate. Thus, the counter may be configured for counting up when the logic values (Data$_{IN}$) supplied to the counter are "low" and down while the logic values (Data$_{IN}$) are "high." An overflow signal may be asserted for one clock cycle if/when the counter passes through zero (e.g., 0x00 to 0xFF). In other words, the overflow signal may be asserted if the Data$_{IN}$ signal is "high" for longer than it is "low." In most cases, the overflow bit may be set as soon as the Data$_{IN}$ signal has been "high" for as long as it was "low." In one embodiment, the up/down counter may be reset on each falling edge of the Data$_{IN}$ signal, as shown in FIGS. 2A and 2B. However, the opposite may be true in other embodiments of the invention.

In general, latch 136 may be configured for generating the decoded data (Data$_{RX}$) based on the outputs provided by up/down counter 134 and edge detect circuit 132. For example, the set terminal of the latch may be coupled for receiving the overflow signal from the up/down counter, while the reset terminal is coupled for receiving the clock pulse (i.e., the reset signal) from the edge detect circuit. If the overflow signal is asserted during a given clock cycle, the latch will supply a logic high Data$_{RX}$ pulse (i.e., 1) to main device components 140. Otherwise, a logic low Data pulse (i.e., 0) will be latched to main device components 140.

As noted above, interface circuit 120-2/130-2 shown in FIG. 2A is configured for decoding data in accordance with a Pulse Width Modulation (PWM) scheme. PWM is commonly used in many applications to encode data within a signal by modulating the duty cycle or pulse width of the signal. In some cases, pulse width modulation may be used to encode one bit of binary data per clock cycle. For example, a 0 may be encoded by modulating the supply voltage, such that during a given clock cycle, the supply voltage is low (i.e., less than the reference voltage) for a longer period of time than it is high (i.e., greater than the reference voltage). The opposite may be used to encode a 1.

FIG. 2B illustrates how interface circuit 120-2/130-2 of FIG. 2A may be used for decoding data in accordance with a 1-bit PWM scheme. As noted above, data detect circuit 120-2 generates a number of logic high and logic low values by comparing the amplitude of the supply voltage (Vdata) to that of the reference voltage ($V_{REF}$). For example, a logic low value (i.e., 0) may be generated if the comparison results indicate that the supply voltage is less than the reference voltage. The opposite would be true for a logic high value. Data decode circuit 130-2 separates the modulated signal into separate clock (Clock$_{RX}$) and data (Data$_{RX}$) signals by counting the number of system clock cycles that occur during each bit period. A 1 is decoded only if the duration of the logic high values exceeds the duration of the logic low values.

The interface circuit shown in FIGS. 2A and 2B is advantageous for many reasons. First of all, the modulated supply voltage remains within the IC operating voltage ($VCC_{MIN}$-$VCC_{MAX}$) at all times. This eliminates the additional circuitry, which is sometimes needed in conventional systems for maintaining the voltage supplied to the system components above $VCC_{MIN}$.

Second, there is no fixed data rate in PWM. This may be useful in some cases, because different designs may have different amounts of capacitance on the power supply lines, and therefore, different rates at which the power supply can swing between higher and lower voltages. By using PWM, the interface circuit described herein may decode data at substantially any data rate. However, the interface circuit is not limited to PWM or to decoding only one bit of data per clock cycle. An alternative PWM scheme is shown in FIGS. 3A and 3B for decoding two bits of data per clock cycle. Although more than two bits may be transmitted and decoded at a time, a trade-off exists between the number of bits transmitted/decoded per clock cycle and the circuit complexity required to decode such a number. Another trade-off exists between the number of bits transmitted/decoded per clock cycle and the signal to noise ratio.

FIG. 3A illustrates one embodiment of an interface circuit 120-3/130-3 that may be used for decoding supply voltages in accordance with a 2-bit PWM scheme. An exemplary timing diagram illustrating the operation of the interface circuit is shown in FIG. 3B. Many of the circuit components shown in FIG. 2A are also used in FIG. 3A. For the purpose of brevity, similar components having similar reference numerals will not be discussed further herein.

In some cases, the data detect circuit 120-3 shown in FIG. 3A may differ from the previous embodiment by including an additional comparator circuit 124 and reference voltage ($V_{REF2}$). For example, in addition to first comparator 122 and reference voltage ($V_{REF1}$) mentioned above, data detect circuit 120-3 includes a second comparator 124 for comparing the supply voltage to a second reference voltage ($V_{REF2}$). In some cases, the supply voltage (Vdata) may be divided down ($V_{DIV1}, V_{DIV2}$) for comparison with the reference voltages. In some cases, two different threshold voltages may be created from a single reference voltage by the differing potential divider ratios. Exemplary potential dividers are shown in FIG. 3A. However, such dividers may not be necessary in all embodiments of the invention.

In general, data decode circuit 130-3 shown in FIG. 3A differs from the previous embodiment by including an additional latch 138. In FIG. 3A, the comparison results ($Data_{IN1}$) generated by first comparator 122 are supplied to edge detect circuit 132 and up/down counter 134, as described above in reference to FIG. 2A. A most significant bit (MSB) of data is generated at the output of latch 136 based on the pulse width of the signal. For example, up/down counter 134 may count the number of system clock cycles that occur during each bit period. As noted above, first comparator 122 may be configured for counting up when the $Data_{IN1}$ signal is low and down when the $Data_{IN1}$ is high. An overflow signal may be supplied to the set terminal of latch 136 only when the duration of the high voltage exceeds the duration of the low voltage. As mentioned above, latch (136 may be reset for the next bit period on falling edges of the $Data_{IN1}$ signal.

Unlike the previous embodiment, a least significant bit (LSB) of data may be generated at the output of additional latch 138 based on the amplitude or pulse height of the signal. For example, the comparison results ($Data_{IN2}$) generated by second comparator 124 may be supplied directly to the set terminal of additional latch 138. As before, the reset terminal may be controlled by edge detect circuit 132. At the end of each bit period, the LSB output by additional latch 138 will be a 1 only if the supply voltage is greater than the second reference voltage ($V_{REF2}$).

In addition to the advantages described above for FIG. 2A, interface circuit 120-3/130-3 shown in FIG. 3A increases the data rate, and thus, decreases the programming time by transmitting/decoding two bits (i.e., a MSB and LSB) at the same time. In some cases, the data rate may be further increased by using more than two comparators in the data detect circuit. However, this increases circuit complexity and decreases the signal-to-noise ratio (SNR). Therefore, the circuit complexity/SNR should be weighed against data rate when choosing an interface circuit for a particular application.

In some cases, the data rates provided by amplitude modulation may not be high enough to meet the timing requirements of a particular application. For example, in some applications it may be desirable to keep programming times very short, as the time taken to program the device is directly proportional to cost (in terms of machine time, labor, etc). As described in more detail below, the interface circuit may be configured to accommodate even higher data rates when high frequency signals are modulated onto the power supply lines.

The next embodiment takes advantage of the fact that certain frequencies are relatively hard/expensive to filter in typical electronic circuits. For example, many ICs place decoupling capacitors on the supply lines to filter out high frequency signals and minimize electromagnetic interference (EMI). In some cases, ferrite beads may be used in conjunction with the decoupling capacitors to provide more effective filtering. However, the effectiveness of the low cost capacitors typically used on circuit boards is reduced above certain frequencies (e.g., around 100 MHz). In addition, most ferrite beads have relatively low impedance below certain frequencies (e.g., below 100 MHz), and therefore, are only effective at filtering out signals above these frequencies. The next embodiment uses this limitation to its advantage. As described in more detail below, high frequency signals (e.g., around 100 MHz) may be modulated onto the supply lines. Although the on-board capacitors and ferrite beads may attenuate such signals, an interface circuit is provided herein for detecting and decoding frequency modulated signals into data.

Figure 4B:
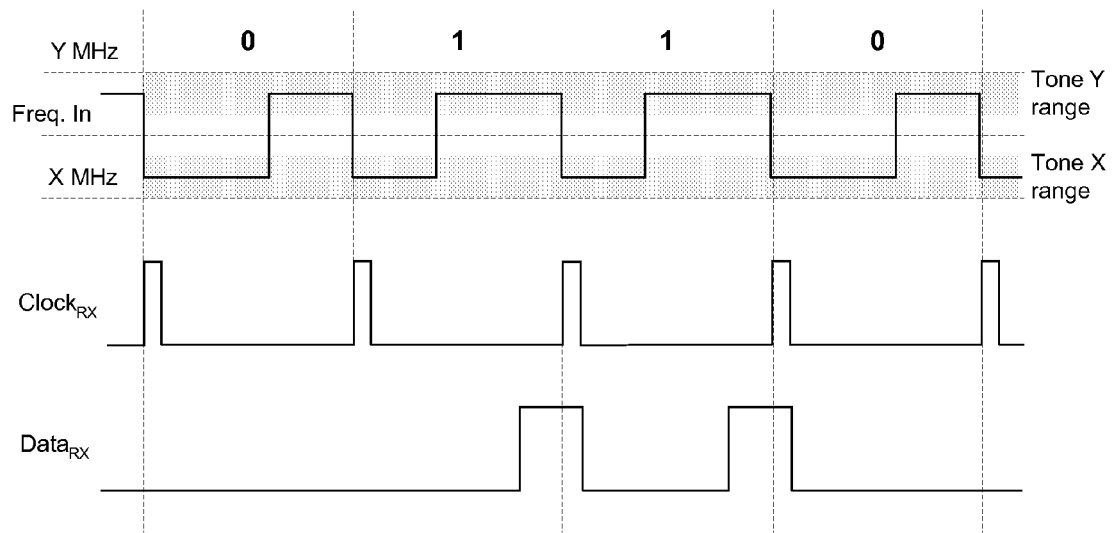
FIG. 4B is a timing diagram illustrating one embodiment of a decoding scheme, which may be used by the interface circuit of FIG. 4A to decode the frequency modulated voltage signals into data.

FIG. 4A illustrates one embodiment of an interface circuit 120-4/130-4 that may be used to decode signals modulated onto supply voltages in accordance with a frequency modulation scheme. An exemplary timing diagram illustrating the operation of the interface circuit is shown in FIG. 4B. Although a Pulse Width Modulated (PWM) Frequency Shift Keying (FSK) scheme is specifically used herein, one skilled in the art would understand how the interface circuit could be modified to accommodate other frequency encoding schemes.

As shown in FIG. 4A, data detect circuit 120-4 may include a pair of tone detect circuits 126/128 for comparing a frequency modulated supply voltage (Vdata) to a pair of frequency ranges (e.g., X MHz and Y MHz) and for generating logic values in response thereto. In some cases, the logic values may be supplied to data decode circuit 130-4 similar to the one shown in FIG. 2A and discussed in detail above. However, some modifications may be needed to accommodate the logic values received from the tone detect circuits, as described in more detail below.

In one embodiment, a phase-lock loop (PLL) circuit may be used to implement the tone detect circuits. In some cases, first tone detect circuit 126 may be configured for generating a logic low value (i.e., a digital 0) when the frequency modulated onto the supply voltage falls within a relatively low frequency range (e.g., close to X MHz). On the other hand, second tone detect circuit 128 may be configured for generating a logic high value (i.e., a digital 1) when the frequency of the supply voltage falls within a relatively high frequency range (e.g., close to Y MHz, where Y>X).

As in previous embodiments, up/down counter 134 may be configured for counting the number of system clock cycles that occur during each bit period. For example, the up/down counter may count up when the Data$_{IN1}$ signal generated by first tone detect circuit 126 is low (i.e., a logic 0) and down when Data$_{IN2}$ signal generated by second tone detect circuit 128 is high (i.e., a logic 1). An overflow signal may be asserted for one clock cycle if/when the counter passes through zero (e.g., 0x00 to 0xFF). In other words, the overflow signal may be asserted only if the duration of the logic high value exceeds the duration of the logic low value generated during a given bit period.

As in previous embodiments, edge detect circuit 132 may be configured for detecting the end of a bit period and for generating a clock pulse (Clock$_{RX}$) in response thereto. In the embodiment of FIG. 4A, a clock pulse is generated on each falling edge of the Data$_{IN2}$ signal. At the end of each clock cycle, the clock pulse is supplied to the reset terminals of up/down counter 134 and latch 136 for resetting the values stored therein. As in previous embodiments, latch 136 is configured for generating the decoded data (Data$_{RX}$) based on the outputs provided by up/down counter 134 and edge detect circuit 132. For example, a 1 may be latched to main device components 140, if the overflow signal is asserted during a given bit period; otherwise, a 0 is latched.

Interface circuit 120-4/130-4 shown in FIG. 4A may be used to increase data rates and decrease programming time over the circuits shown in FIGS. 2A and 3A. In one embodiment, the interface circuit shown in FIG. 4A may be configured for decoding supply voltages modulated around 100 MHz. For example, first tone detect circuit 126 may be configured for detecting tones of about 90 MHz, while second tone detect circuit 128 is configured for detecting tones of about 110 MHz. As such, a 0 may be represented by a burst of 90 MHz modulated onto the supply lines, while a 1 is represented by a burst of 110 MHz. Such an embodiment could provide data rates in excess of 1 Mbps. However, the interface circuit shown in FIG. 4A is not limited to the exemplary frequencies specifically mentioned herein. Although some frequencies may be easier to detect than others, the interface circuit shown in FIG. 4A may be modified for decoding substantially any frequency modulated signal.

III. A General Method for Communicating with an Embedded IC

Figure 5:
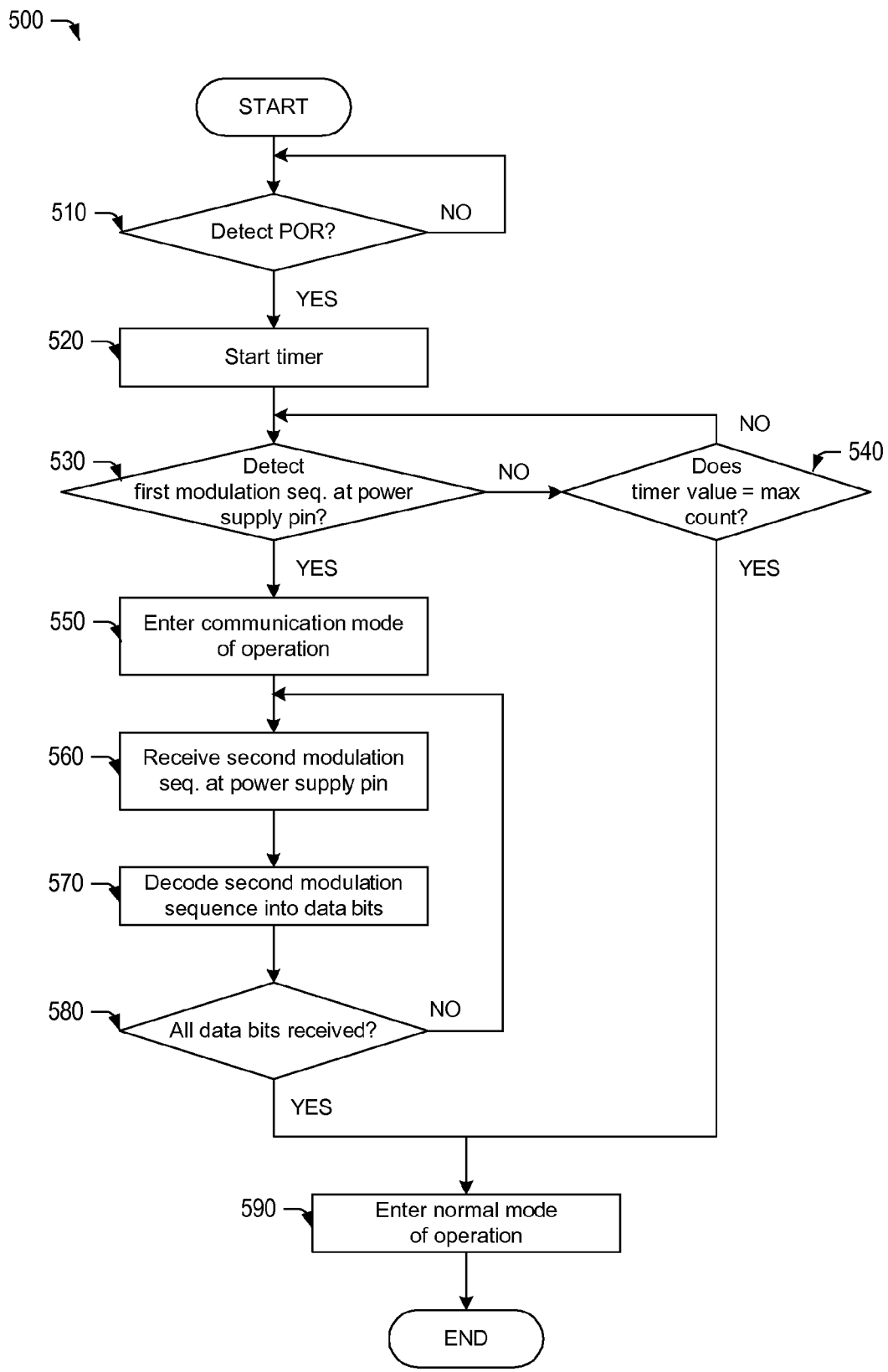
FIG. 5 is a flowchart diagram illustrating one embodiment of a method for programming or communicating with an integrated circuit via a power supply pin.
Figure 6:
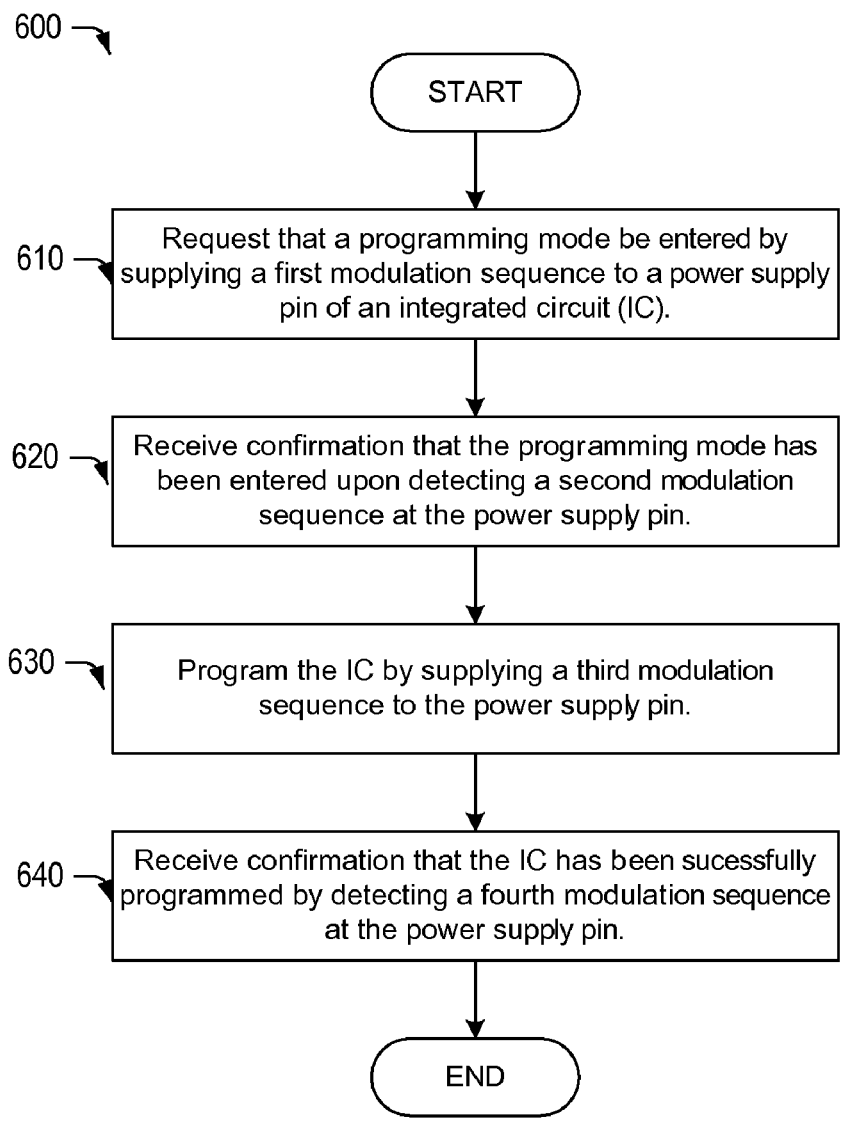
FIG. 6 is a flowchart diagram illustrating one embodiment of a method for programming an integrated circuit in-system.
Figure 7:
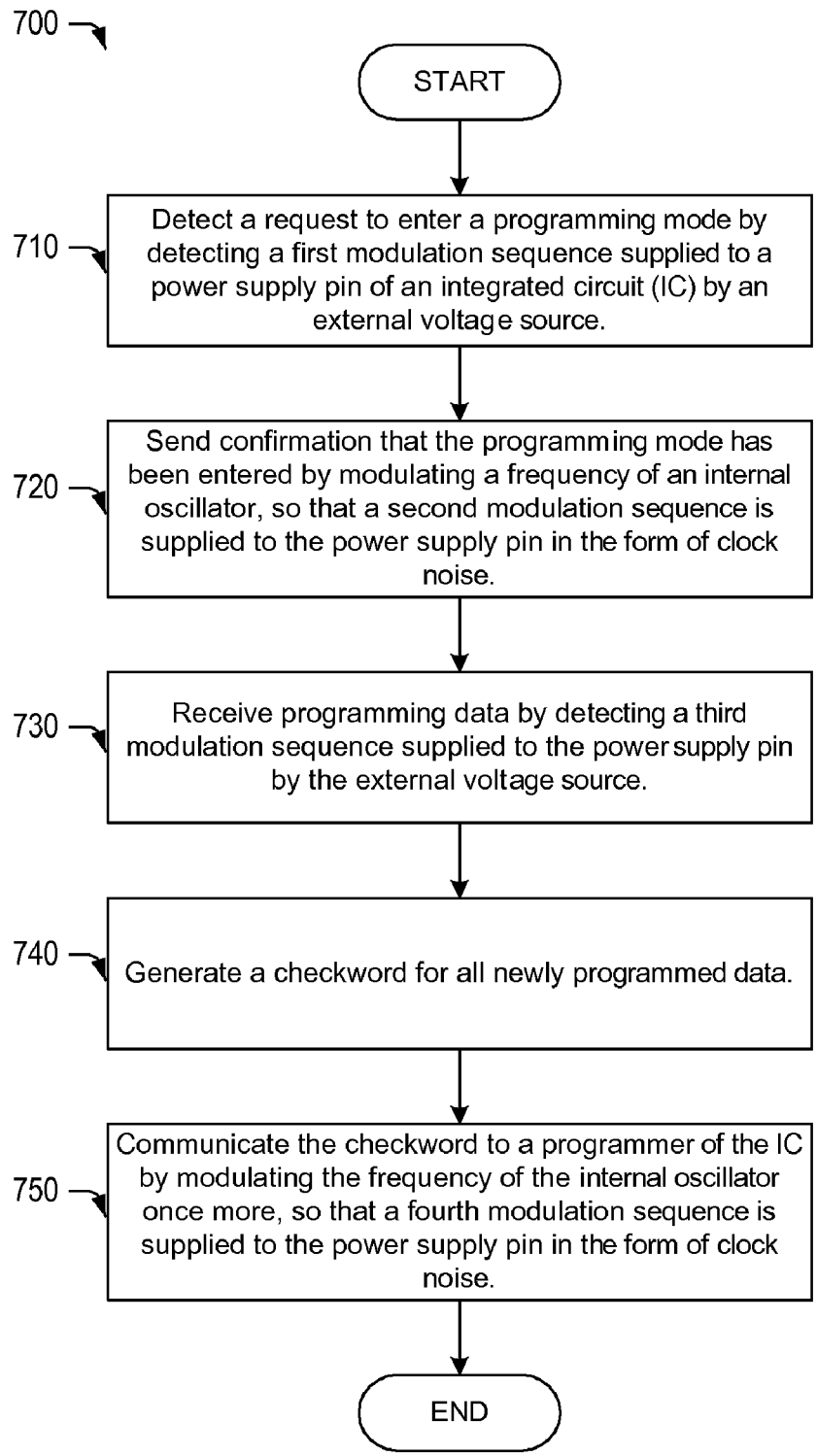
FIG. 7 is a flowchart diagram illustrating another embodiment of a method for programming an integrated circuit in-system.

FIG. 5 illustrates one embodiment of a method for communicating with an integrated circuit (IC) via a power supply pin. In general, the method shown in FIG. 5 may be used for exchanging data with an IC over the power supply lines. Substantially any type of data may be exchanged. As noted above, "data" may refer to communication data, programming data and/or programming instructions. As such, the method shown in FIG. 5 may be used for communication or programming purposes. A more specific method for programming an IC via a power supply pin is shown in FIGS. 6 and 7 and discussed in more detail below.

In some cases, the IC may be embedded onto a circuit board prior to programming or communication. As noted above, an IC may be described as "embedded" once it is permanently installed onto a circuit board. By using the power supply pin for communication and/or programming purposes, the methods shown in FIGS. 5-7 may be used to reduce the overall pin count, package size and cost typically associated with the design and manufacture of ICs. If the circuit board is placed in the final product enclosure, the methods described herein may provide an additional level of convenience by allowing in-system programming of an embedded IC (or inter-IC communication) without opening the enclosure or exposing special programming pins to the customer.

In order to perform the methods described herein, interface circuit 110 may be coupled between power supply pin 150 and main device components 140, as shown in FIG. 1A. Examples of suitable interface circuits are illustrated in FIGS. 2-4 and described in detail above. However, the methods described below are not limited to the few interface circuits specifically shown herein. Instead, any interface circuit capable of detecting and decoding variations in the amplitude, frequency or phase of the supply voltage may be used to perform the methods discussed below.

As shown in FIG. 5, a general method 500 for programming or communicating with an integrated circuit (IC) may begin after power has been applied to the IC. For example, the output of a Power-On Reset (POR) circuit may be monitored 510 to determine if a minimum operating voltage has been applied to the IC. If a POR condition is detected 510, a timer may be started 520 to track a "timeout" period following the POR condition. As noted above, the "timeout" period may refer to a defined period of time (e.g., 10 ms), during which the supply voltage is monitored for a predetermined sequence of 1's and 0's (i.e., a first modulation sequence). In some cases, the first modulation sequence may be generated by another integrated circuit (not shown) wanting to initiate communication with the embedded IC. In other cases, the first modulation sequence may be generated by a device programmer (e.g., device programmer 190, FIG. 1A) to initiate programming of the embedded IC.

If the first modulation sequence is not detected 530, the method determines whether or not the timer has exceeded its maximum count 540. If the timer runs out before the first modulation sequence is detected, the integrated circuit enters a normal mode of operation 590. Otherwise, the method continues to monitor the supply voltage until the maximum count is exceeded or the first modulation sequence is detected.

If the first modulation sequence is detected, the integrated circuit enters a communication mode of operation 550. In this mode, the integrated circuit is able to receive communication or programming data over the power supply lines. For example, the integrated circuit may receive a second modulation sequence at the power supply pin 560. Similar to the first sequence, the second modulation sequence may be generated by another IC (not shown) or by a device programmer (FIG. 1A). As the second modulation sequence is received, it may be decoded 570 into a sequence of data bits. Exemplary means for decoding the second modulation sequence are described above in reference to FIGS. 2-4. Once all data bits are received 580, the IC may enter a normal mode of operation 590.

In one embodiment, a microcontroller may perform the method shown in FIG. 5 for updating its reprogrammable firmware. Exemplary embodiments of a microcontroller are described above in reference to FIGS. 1B and 1C. In some cases, the microcontroller may perform one or more steps of the method by executing program instructions previously stored therein (e.g., by executing "boot firmware" stored within NVM 142 or RAM 143 of FIG. 1B). In other cases, one or more steps of the method may be performed by hardware included within the microcontroller (e.g., CPU 145, programming circuits 147, oscillator 148 and trim register 149 of FIG. 1C). In either case, the first and second modulation sequences may be detected and decoded by interface circuit 110, coupled between the power supply pin 150 and main device components 140 of the IC. However, the method shown in FIG. 5 is not limited to a microcontroller in all embodiments of the invention. Instead, the method may be performed by substantially any IC whose interface circuit is coupled for detecting and decoding variations in the supply voltage.

IV. Exemplary Methods for Programming an IC

FIG. 6 illustrates one embodiment of a method 600 for programming an integrated circuit (IC) via a power supply pin (e.g., pin 150, FIG. 1A) of the integrated circuit. In some cases, the method may be used for programming an embedded IC in-system. The method steps shown in FIG. 6 are typically performed by a user or programmer of the IC. In some cases, the user may begin 610 by requesting that the IC enter a programming mode of operation. As noted above, the request may involve supplying a predetermined sequence of 1's and 0's (i.e., a first modulation sequence) to the power supply pin of the integrated circuit. In general, the first modulation sequence may be produced by modulating the amplitude, frequency or phase of an external voltage signal supplied to the power supply pin. In some cases, an external voltage source (e.g., device programmer 190, FIG. 1A) may be used to modulate the supply voltage.

Next, the user may receive confirmation that the programming mode has been entered 620 upon detecting a second modulation sequence at the power supply pin. In general, the second modulation sequence may be produced by an IC component coupled for modulating the amplitude, frequency or phase present on the internal supply lines of the IC. In some cases, the second modulation sequence may be produced by changing a switching frequency of an internal oscillator (e.g., oscillator 148, FIG. 1C). In such cases, the user may detect the second modulation sequence by detecting "clock noise" at the power supply pin.

Once the programming mode has been entered and confirmed, programming data may be supplied to a nonvolatile storage component of the IC (e.g., NVM 142, FIG. 1B or memory 146, FIG. 1C) by supplying a third modulation sequence to the power supply pin. Similar to the first modulation sequence, the third modulation sequence may be produced by an external voltage source (e.g., a device programmer) coupled for modulating the amplitude, frequency or phase of the external voltage signal supplied to the power supply pin. The third modulation sequence may include any data and/or programming instructions necessary to program the IC.

Once programming is complete, the user may receive confirmation 640 that the IC has been successfully programmed by detecting a fourth modulation sequence at the power supply pin. Similar to the second modulation sequence, the fourth modulation sequence may be produced by an IC component coupled for modulating the amplitude, frequency or phase present on the internal supply lines of the IC. In one example, the fourth modulation sequence may be produced by changing the switching frequency of an internal oscillator, as described above. In some cases, the method may end if the fourth modulation sequence indicates that the IC has been successfully programmed. However, if the fourth modulation sequence provides unfavorable results, one or more steps of the method may be repeated to reprogram the IC.

FIG. 7 illustrates another embodiment of a method 700 for programming an integrated circuit (IC) via a power supply pin (e.g., pin 150, FIG. 1A) of the integrated circuit. In some cases, the method may be used for programming an embedded IC in-system. The method steps shown in FIG. 7 are typically performed by one or more components of the IC. In some cases, the method may begin 710 by detecting a request to enter a programming mode of operation. For example, a request may be detected if a predetermined sequence of 1's and 0's (i.e., a first modulation sequence) is detected on the supply line during a timeout period immediately following POR. As noted above, the first modulation sequence may be generated by modulating the amplitude, frequency or phase of an external voltage signal. In some cases, a frequency modulated voltage signal may be supplied to the power supply pin (e.g., pin 150, FIG. 1A) of the IC by an external voltage source.

Next, an IC component may confirm that the programming mode has been entered 720 by modulating the amplitude, frequency or phase present on the internal supply line of the IC. In some cases, a switching frequency of an internal oscillator (e.g., oscillator 148, FIG. 1C) may be modulated, so that a second modulation sequence is supplied to the power supply pin in the form of clock noise. For example, firmware or hardware may be included within the IC for over-writing values stored within a trim register (e.g., register 149, FIG. 1C) for controlling the switching frequency. In some cases, the second modulation sequence may be produced by over-writing the trim values, such that bursts of high frequency tones are modulated onto the supply lines as "clock noise."

Once the programming mode has been entered and confirmed, programming data may be received 730 by detecting a third modulation sequence on the supply lines. Similar to the first modulation sequence, the third modulation sequence may be generated by modulating the amplitude, frequency or phase of an external voltage signal. In some cases, a frequency modulated voltage signal may be supplied to the power supply pin by an external voltage source. The third modulation sequence may include any data and/or program instructions necessary to program the IC.

After the programming data is stored, an IC component may perform a checksum operation 740 on all newly programmed memory locations. The result of the checksum may be communicated 750 to a programmer of the IC by modulating the amplitude, frequency or phase present on the internal supply lines of the IC. For example, the switching frequency of the internal oscillator may be modulated, as described above, so that a fourth modulation sequence is supplied to the power supply pin in the form of clock noise. In some cases, the method may end if the fourth modulation sequence indicates that the IC has been successfully programmed. However, if the fourth modulation sequence provides unfavorable results, one or more steps of the method may be repeated to reprogram the IC.

FIGS. 6 and 7 illustrate various embodiments of methods that may be used for programming an IC via a power supply pin. In particular, FIGS. 6 and 7 divide the programming method into steps taken by the programmer (i.e., the "front channel" method of FIG. 6) and steps taken by the device (i.e., the "back channel" method of FIG. 7). However, in order to program the IC, the methods shown in FIGS. 6 and 7 are preferably combined so that data is exchanged between the programmer and the device. The following example illustrates one embodiment of a combined programming method.

As noted above, many integrated circuits (e.g., microcontrollers) have internal "crystal-less" oscillators, which enable the IC to generate its own clock signal without the need for an external oscillator. However, because "crystal-less" oscillators are inherently inaccurate, calibration data is often stored on-chip to "trim" the oscillator or calibrate the oscillator frequency. For example, the switching frequency of the oscillator may be adjusted by over-writing the calibration data stored within the trim registers.

As noted above, the switching frequency is often modulated onto the supply lines, even though attempts have been made to minimize such "clocking noise." For example, some ICs add decoupling capacitors and/or ferrite beads to the supply lines to attenuate the amount of clock noise present on the supply lines. However, because decoupling capacitors and ferrite beads have reduced effectiveness around certain frequencies, clock noise is almost always detectable at the power supply pin. The present invention uses this limitation to its advantage. For example, FIG. 4A illustrates one embodiment of an interface circuit that may utilize the clocking noise on the supply lines to program an embedded IC. As described in more detail below, the methods shown in FIGS. 6 and 7 may also use the clocking noise on the supply lines to program an embedded IC.

An in-system programming sequence may generally be implemented as follows. After applying power to an embedded integrated circuit, a programmer of the device may begin modulating an externally generated supply voltage with a predefined sequence of '1's and '0's (i.e., the first modulation sequence). Unlike other programming methods, the modulated supply voltage remains within the allowed DC operating voltage of the device at all times. In general, the external supply voltage may be modulated in accordance with any amplitude, frequency or phase modulation scheme. However, a frequency modulation scheme may be preferred in the current example so that "back channel" data may be supplied to the programmer by modulating the switching frequency of an internal oscillator. The switching frequency may then be detected by the programmer as clock noise on the supply lines.

After the external supply voltage exceeds the minimum IC operating voltage (i.e., after achieving POR), the device monitors the supply lines for a defined period of time (i.e., a "timeout period"). If the first modulation sequence is detected in the allotted time, the device modulates its internal oscillator frequency in a predetermined manner to indicate to the programmer that the device has been successfully placed in programming mode. As noted above, the device may modulate the oscillator frequency by over-writing the calibration values stored within the trim register coupled to the internal oscillator. The variations in switching frequency may produce a second modulation sequence on the supply lines.

In one example, an internal oscillator may have a switching frequency of about 24 MHz±3%. In some cases, the back channel data may be modulated onto the supply lines by switching the oscillator frequency between 22 MHz and 26 MHz, with 22 MHz indicating a 1 and 26 MHz indicating a 0. In other cases, the back channel data may be modulated onto the supply lines using PWM, with a short burst of 22 MHz followed by a longer burst of 26 MHz indicating a 1 and a long 22 MHz burst followed by a short 26 MHz burst indicating a 0. Clearly, other frequencies and frequency encoding schemes could be used to represent the data.

The programmer monitors the clock noise present at the power supply pin to determine if the device has been placed in the programming mode. The programmer may recognize the acknowledge signal from the device by detecting certain variations in the clock noise (i.e., by detecting the second modulation sequence). Once the acknowledge signal is received, the programmer begins modulating the externally generated supply voltage with programming data (i.e., a third modulation sequence). For example, the frequency of the externally generated supply voltage may be modulated between 22 MHz and 26 MHz, as described above. Regardless of the particular frequencies or encoding schemes used, the modulated supply voltage remains within the allowed DC operating voltage of the device at all times.

The device detects the signals modulated onto the supply lines, decodes the signals into data and programs the data into reprogrammable portions of its memory. When all programming data has been received, the device performs a checksum operation on all newly programmed memory locations and then modulates its internal oscillator frequency to communicate the checksum to the programmer. For example, the switching frequency of the internal oscillator may be modulated between 22 MHz and 26 MHz, as described above. The programmer may receive the checksum by monitoring the clock noise present at the power supply pin for a fourth modulation sequence. Once the checksum is received and decoded, the programmer decides whether or not programming is complete. For example, programming may end if the checksum is correct. If the checksum is not correct, one or more steps may be repeated to reprogram the device memory.

As a particular advantage, the method described above provides a highly robust communications interface by providing a "back channel" method for verifying data exchange. In one implementation, the method may simply be used to save pins on an IC. For example, the method may allow inter-IC communication or in-system reprogramming (ISR) of an embedded IC without any pins dedicated to communication or programming. In another implementation, the method may be used to program a device, which has been embedded on a circuit board and/or placed inside an enclosure. For example, an MCU in a battery-powered device may be programmed through the battery connections of the device without any disassembly or need to provide a programming pin or data bus connector. Although the invention has been repeatedly described in terms of its implementation in an MCU, the invention is equally applicable to any electronic device.

It will be appreciated to those skilled in the art having the benefit of this disclosure that this invention is believed to provide an improved interface circuit and method for programming or communicating with an IC via a power supply pin. Further modifications and alternative embodiments of various aspects of the invention will be apparent to those skilled in the art in view of this description. It is intended that the following claims be interpreted to embrace all such modifications and changes and, accordingly, the specification and drawings are to be regarded in an illustrative rather than a restrictive sense.

What is claimed is:

1. A method for programming an integrated circuit through a power supply pin configured to supply power to integrated circuit components, the method comprising:
   generating a power-on reset event by applying power to the power supply pin;
   generating a first modulation sequence on the power supply pin, wherein the first modulation sequence provides instructions for entering a programming mode of operation;
   receiving a second modulation sequence on the power supply pin, wherein the second modulation sequence confirms entering the programming mode of operation and is generated by an internal integrated circuit component;
   generating a third modulation sequence on the power supply pin, wherein the third modulation sequence provides programming instructions for programming a non-volatile memory; and
   receiving a fourth modulation sequence, wherein the fourth modulation sequence confirms receipt of the programming instructions and is generated by an internal integrated component.

2. The method of claim 1, further comprising terminating the programming mode.

3. The method of claim 1, further comprising:
generating a fifth modulation sequence on the power supply pin, wherein the fifth modulation provides instructions for entering a non-programming mode; and
receiving a sixth modulation sequence on the power supply pin, wherein the sixth modulation sequence confirms entering the non-programming mode.

4. The method of claim 1, wherein the programming instructions comprise instructions for erasing one or more non-volatile memory elements.

5. A programming device configured to provide programming instructions to an integrated circuit through a power supply pin, the power supply in configured to supply power to integrated circuit components, the programming device configured to:
trigger a power-on-reset (POR) event on the integrated circuit;
provide a first voltage signal on the power supply pin to cause the integrated circuit to enter a programming mode of operation;
receive a second voltage signal on the power supply pin to confirm entry into the programming mode by the integrated circuit, the second voltage signal being generated by an internal integrated circuit component;
provide a third voltage signal on the power supply pin to provide programming instructions for programming a non-volatile memory; and
receive a fourth voltage signal on the power supply pin to confirm receipt of the programming instructions, the fourth voltage signal being generated by an internal integrated circuit component.

6. The programming device of claim 5 further configured to terminate programming mode.

7. The programming device of claim 5, further configured to generate a fifth voltage signal on the power supply pin to cause the integrated circuit to enter a non-programming mode and to receive a sixth voltage signal on the power supply pin to confirm entry into a non-programming mode by the integrated circuit.

8. The programming device of claim 5 wherein the programming instructions comprise instructions for erasing one or more non-volatile memory elements.

9. The programming device of claim 5 wherein the voltage signals are generated by toggling a programming output between a first voltage and a second voltage.

10. The system of claim 9 wherein the programming instructions comprise instructions to erase one or more non-volatile memory elements.

11. A system comprising:
a programmer configured to send programming instructions; and
an integrated circuit configured to receive programming instructions from the programmer on a power supply pin, the power supply pin configured to supply power to integrated circuit components;
wherein the programmer is configured to trigger a power-on-reset event on the integrated circuit and to provide a first plurality of modulation signals to the integrated circuit for entry into a programming mode of operation and to send programming instructions, and
wherein the integrated circuit is configured to detect each of the first plurality of modulation signals and to send a second plurality of modulation signals to confirm entry into a programming mode of operation and receipt of programming instructions, the second plurality of modulation signals being generated by an internal integrated circuit component; and
wherein the integrated circuit is configured to program a non-volatile memory according to the programming instructions.

* * * * *